UNITED STATES PATENT OFFICE 2,409,448

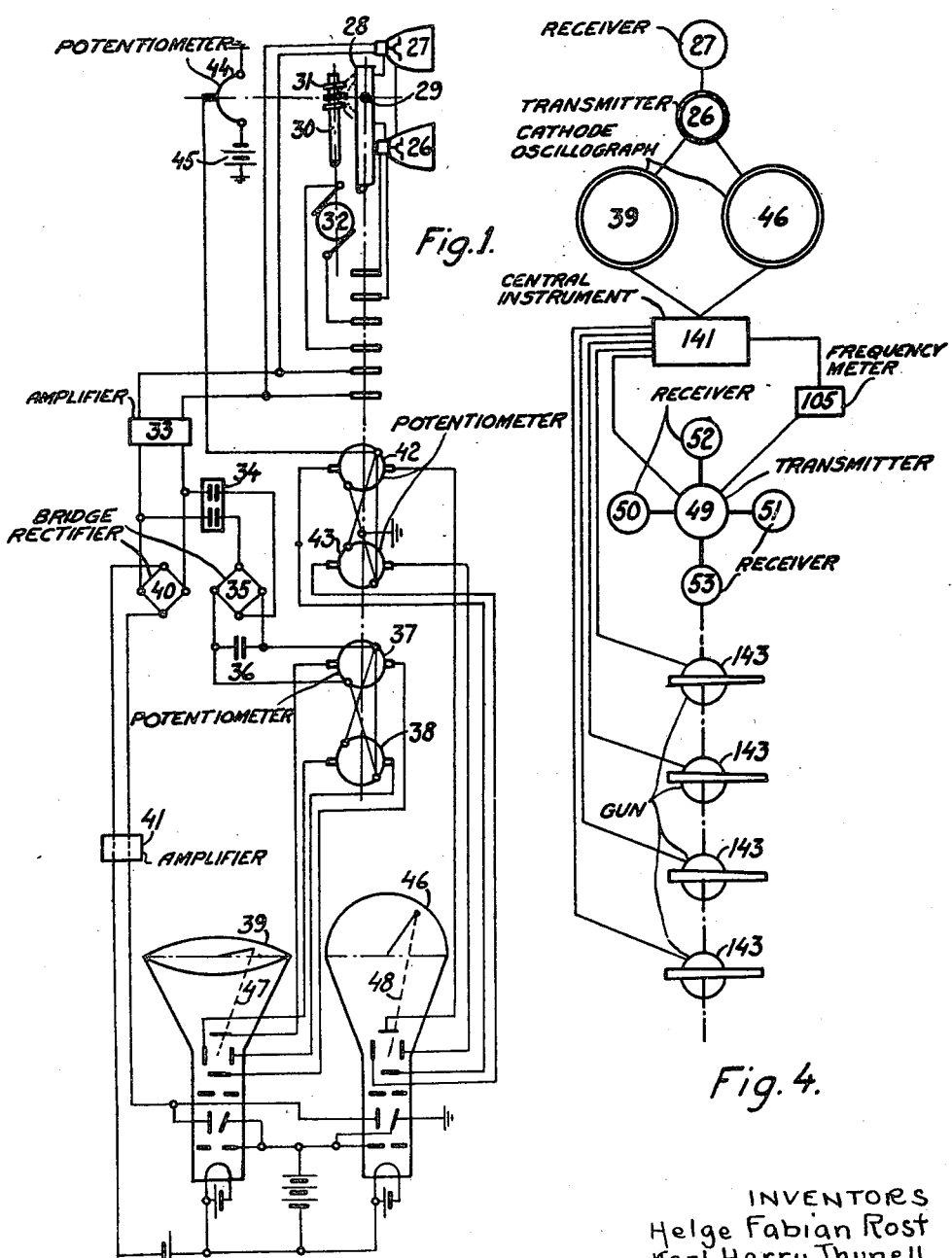

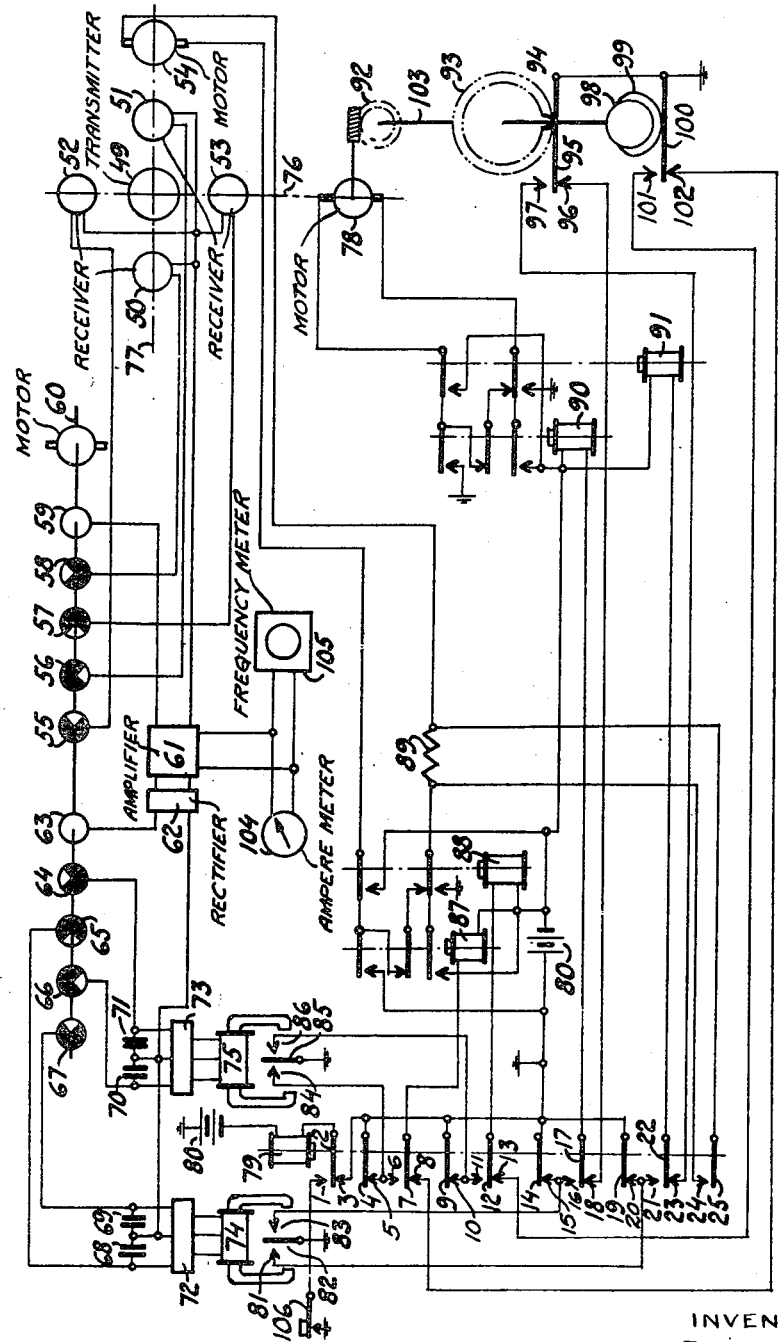

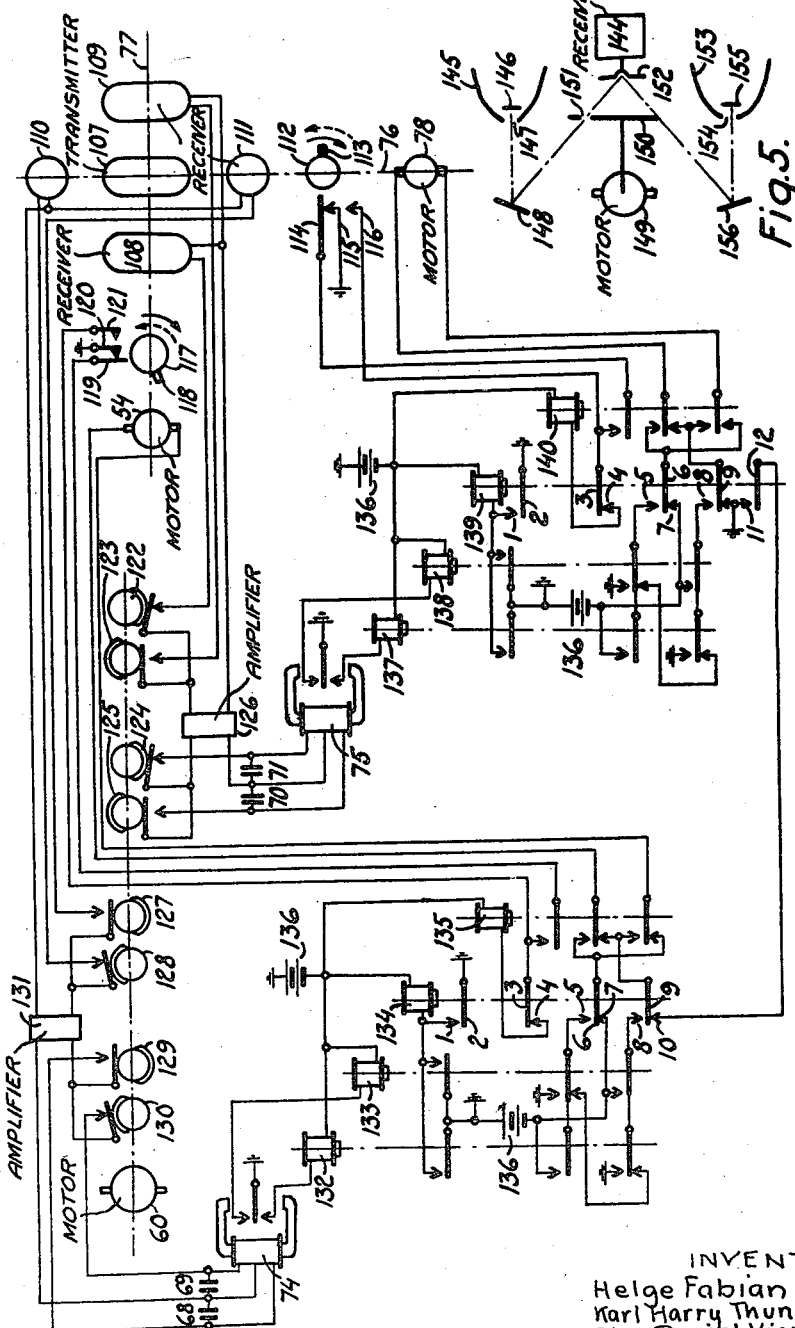

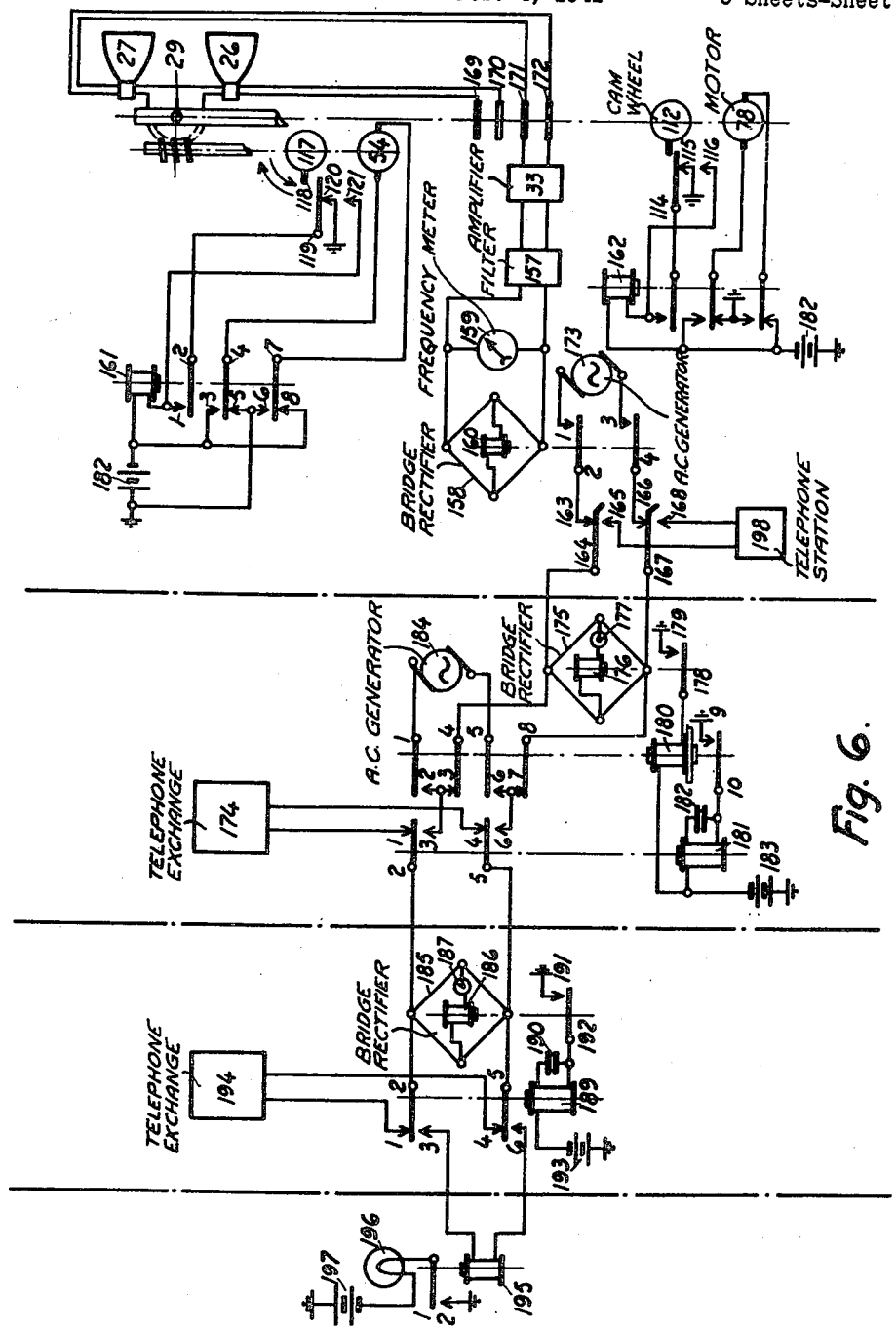

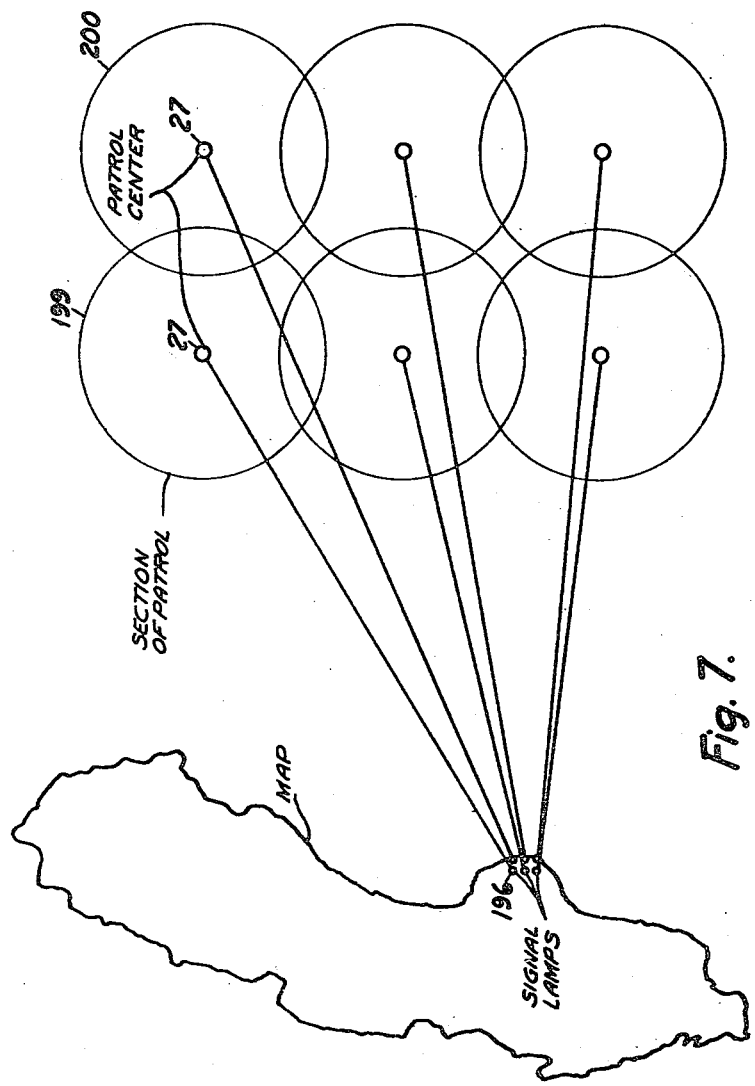

SELF-TRACKING RADIO DIRECTION AND DISTANCE DEVICE

Helge Fabian Rost, Djursholm, Karl Harry Thunell, Nockeby, Sten Daniel Vigren, Stockholm, and Per Harry Elias Claesson, Jakobsberg, Sweden Application February 4, 1941, Serial No. 377,344
In Sweden January 10, 1940

16 Claims. (Cl. 250—1.54)

The present invention generally relates to a device for fire control devices for artillery and the like and has reference in particular to apparatus for automatic continuous determination of direction and distance in space of stationary or movable objects by means of directed waves and preferably ultrashort radio waves.

The invention is particularly suitable for antiaircraft defense, irrespective of whether a plane is visible from the place of observation or, for example, is invisible due to the fact that it is flying above the clouds or in the dark or behind smoke screens.

The invention is also suitable for use on vessels at sea to spot objects on land, at sea or in the air.

The invention is also suitable to act as an antiaircraft alarm for remote indication at a central fire control command.

According to the present invention direction and distances of which are invisible to an observer can immediately, automatically and continuously be indicated or observed, as if the objects in reality were visible.

The invention according to its general scope can be put to a multitude of different uses of which the following application to antiaircraft defense is but one example; same will be more closely described hereafter.

For air defense the main object of the invention is to rapidly locate enemy aircrafts and to simultaneously prepare and direct the antiaircraft guns against such aircraft.

Heretofore many expensive instruments have been necessary for each antiaircraft battery, such as sound detectors, sound-lag correctors, position comparators, searchlights as well as various transmission and remote control systems, which instruments are used at night in addition to the following regular artillery instruments: Range and direction finders, instruments for the measuring of angle of elevation, side angle, instruments for measuring the velocities of said angles and also the accelerations of the same angles, several of which instruments are included in a complicated central control instrument.

Heretofore, airplanes and other aircraft were spotted by means of a sound locator arranged to listen to the motor or propeller sound emitted from an aircraft. Its greatest range under favourable conditions is about 10 kilometers. At normal velocities, for example at 360 km/hour, a bombing plane will travel a great part of said distance before the sound is noticed at the sound locator and same is adjusted for sure following of the target. When we further consider the time required for adjustment of the sound lag corrector, of the position comparator, the aiming of the search light, lighting same and searching for the target, it will be clear that there remain but a few seconds to obtain distance measurements and for firing and aiming the guns. Valuable time is thus lost in operating and adjusting all these instruments and the anti-aircraft artillery often has not even time to fire a single shot at the attacking air forces. Much valuable time is saved by the present invention and the whole antiaircraft defense can be considerably simplified and cheapened. At the same time the efficiency of the air defence will be considerably increased.

According to the present invention a general locating device is used which makes possible the direct observation of targets by means of light spots on fluorescent screens for instance, on which the battery commander can simultaneously observe the distances and side and elevation angles of the objects in the air with respect to the place of observation. This observation is independent of the weather, of clouds, smoke screens and the like and can equally well be made at night as in day time.

Such a device causes no appreciable time delay and as soon as an aircraft comes within the field of action of the device, the aircraft can continuously be observed with respect to direction as well as to distance.

In brief, the present invention comprises a device for locating and following objects in space by means of rotatable transmitting and receiving means pointing in substantially the same direction for the transmission and reception of directed radio waves reflected from the object. The transmitting and receiving means are provided with driving means for rotating them in one or more planes. According to the invention, special directing means are coupled to said driving means and adapted to automatically turn said transmitting and receiving means in predetermined paths in said plane or in any of said planes in order to systematically search out an object in space. Furthermore, amplifying and distributing means are provided. Same are coupled to the receiving means and to an electromagnetic operating device and adapted to transfer received radio energy to said operating device. The latter is constituted for instance by current direction sensitive indicating relays. At the moment when reflected energy from a located object is received by the receiving means, these relays actuate a switching device coupled to the same. The switching device serves to disconnect said directing means from said driving means, in order to establish control of said driving means for following said object in accordance with the movements of said relays, whereby the amplifying and distributing means are adapted successively to receive and amplify amounts of radio energy from two somewhat diverging directions in the same plane, corresponding to equal parts of the field of search. As a result, two such successively received amounts of radio energy, are transferred and the resulting energy difference delivered to said relays in order to indicate the movements of said object in space in one direction or the other, in the respective plane, depending upon which amount of energy is the greater.

According to another embodiment of the invention the device can also automatically locate the target, for example an aircraft, and once located the device will closely follow said target so that at every moment its position and distance from the point of observation can be observed and read.

By means of a synchronous drive between the device and the guns of a battery, provided the necessary corrections of the shooting elements are made, the locating device and guns can be made to follow each other in such a way that with the necessary ahead-aiming-correction depending upon the speed of the target, a perfect hit upon the target can be made. The artillery men have thus only to set the time fuse of the projectiles to make them explode at the predetermined range.

The invention will be readily understood on reference to the accompanying drawings in which:

Fig. 1 diagrammatically shows an auxiliary apparatus for locating aircraft, whereby distance and sideangle to the target can be observed on a fluorescent screen, while on another screen the elevation and side angles to the same target can be observed.

Fig. 2 is a diagram showing an automatic, individual target locating and following device in three dimensions together with instruments for the determination of the exact distance to said target at any moment. The device is provided with one transmitter and four receivers for ultrashort radio waves.

Fig. 3 is a diagram showing a target locating device arranged to send out a flat vertical curtain of radio waves and including four receivers.

Fig. 4 is an abbreviated diagram showing a general fire control post and an individual target locating and following device according to Fig. 2 or Fig. 3.

Fig. 5 illustrates a modification of the device according to Fig. 2, comprising one receiver but two parabolic reflectors or the like to receive reflected radio waves.

Fig. 6 is a variation of Fig. 1 for general locating of aircraft and the transmission of alarm signals to a remote control central station as soon as an aircraft enters the range of the locator device, said alarm signals to be sent over existing lines, for example telephone lines without materially interrupting normal service over said lines.

Fig. 7 is a diagram showing several fire control districts connected to the fire control central station, where a lamp signal is located at the exact spot of the map, that corresponds to the location of the particular locator device.

In Fig. 1 26 is a transmitter for directed ultrashort radio waves. 27 is a receiver of the same kind. Both transmitter and receiver are rotatable and mounted on a shaft 28 which is driven by a motor (not shown on the drawings). At the same time as the shaft 28 is rotated, the transmitter and the receiver are arranged to turn 90° from horizontal to vertical searching position and vice versa. The turning takes place around the center pin 29 by means of worm gear 31, shaft 30 and motor 32. The shaft 30 and motor 32 are mounted on shaft 28 in known manner. The whole structure is turned in such a way that the transmitter and the receiver describe a spiral curve so that the whole or part of the sky can be searched. The rapidity of the searching operation depends on the velocity of shaft 28 and the exactness of the picture that is desired.

By means of collector rings on respective shafts and fixedly arranged contact brushes, or vice versa, connection of the integral moving electrical parts of a circuit to stationary parts of the device can be made.

33 is an amplifier for received radio waves. 34 is a device comprising, for example, condensers of variable impedance for variable frequencies so that more current is allowed to pass at high frequencies than at low ones. 35 and 40 are rectifying devices. 36 is a condenser. 37—38 and 42—43 are potentiometers or circular resistances fixed on the shaft 28. 41 is an amplifying device connected to the baffle plates of cathode ray tubes 39 and 46. 39 is a cathode ray tube with plane fluorescent screen and 46 is a cathode ray tube with semi-spherical screen.

The device shown in Fig. 1, which is particularly adapted to locate aircrafts and the like, operates in the following way. While transmitter and receiver 26 and 27 rotate on shaft 28 they turn at the same time more slowly about pin 29 in vertical direction, and move, for example, from horizontal to vertical position and back to horizontal position. If desired, the vertical movement can be limited to only a certain minor sector. Shaft 28 can also be given a back and forth movement instead of a continuously rotating motion, if only a certain part of the sky is to be observed. The transmitter 26 emits preferably frequency modulated ultrashort and directed radio waves which, in part, can be directly received by the receiver 27. If the emitted radio waves encounter on their way, for example an aircraft, they are partly reflected by the same and as a result, the reflected waves can be received by the receiver 27. A beat frequency is thereby formed between the emitted and the reflected received wave which frequency can be measured and is proportional to the distance.

The obtained beat frequency is amplified in the amplifier 33 whereafter the amplified current is divided, one part flowing via the frequency sensitive amplifying device 34 and rectifier 35 to the potentiometers 37 and 38 and the deflecting plates of the cathode ray tube 39.

The other part of the amplified current flows via rectifier 40 and the amplifying device 41 to the baffle plates of cathode ray tubes 39 and 46.

Upon receipt of a reflected wave a deflected electron ray 47 of cathode ray tube 39 will produce a light spot on the fluorescent screen, whereby the distance from the center of said screen is proportional to the distance to the aircraft. The side direction of the latter is directly given with reference to a certain known coordinate system, because, due to the potentiometers 37 and 38 and the deflection plates the corresponding light spot always falls in the same direction towards which the receiver 27 is directed. It should be clear that instead of the potentiometers shown in the drawings may be used any other known device to obtain synchronous movement between the cathode ray and the receiver without departing from the scope of the invention.

In order to obtain the elevation and side angles to a certain aircraft, or in order that the battery commander may know at least if an aircraft or other target is situated at the given distance high in the sky or on the horizon, we use the cathode ray tube 46. Tube 46 is provided with a semispherical fluorescent screen. By means of the potentiometers 42 and 43 connected to the deflection plates of the tube 46, a light spot is obtained showing the side angle of the target or of the receiver 27.

By combining with said potentiometers a potentiometer 44 arranged in combination with the axis or pin 29 the electron ray of tube 46 can be moved so that it will always point in exactly the same direction as the receiver 27.

In certain cases it will be sufficient if only tube 46 is used for the purpose of obtaining both side and elevation angles, while the distance could at any moment be read on a frequency and distance indicating instrument which in such a case should be connected instead of the frequency sensitive device 34.

According to a modification of the present invention, general orientation with reference to the target can be achieved by using only the spherical tube 46. On the screen of the latter an approximate indication of the distance can be obtained. In such a case tube 39 and potentiometers 37 and 38 are not needed. The condensers 34 are charged proportionally to the beat frequency when an echo is received; said condenser can be connected for a short moment in series with the deflection plates of tube 46 by means of rapid (electron) relays that can be actuated by the received amplified echo current. In such a way an extra deflection of the cathode ray can be obtained which extra deflection indicates the approximative distance to the target looked for.

Measurement of the radial velocity of the target is carried out by means of a distance indicating instrument, for example, by means of the rectified beat frequency. If, for example, in Fig. 1 such an instrument with series-connected condenser is disposed in parallel with the frequency sensitive device 34, an indication of the variation of potential is obtained. Inasmuch as the deflection of said instrument is proportional to $di/dt$ of the current through the said condenser, and the distance is a certain function of the common potential, a means of measuring the radial velocity of the target is obtained.

In Fig. 2, element 49 is a directed short wave transmitter, for example a magnetron tube, a klystron or a velocity modulated tube. 50, 51, 52 and 53 are four receivers symmetrically arranged with respect to the transmitter. The transmitter as well as the receivers are arranged to rotate or oscillate about the vertical shaft 76, driven by motor 78. On said shaft there is mounted a horizontal shaft 77, driven by motor 54 about the shaft of which both transmitter and receivers can rotate or swing forth and back. In this manner, the locator device performs a spiral movement for searching both in horizontal and vertical directions in a manner similar to that described in Fig. 1. When the transmitted wave encounters an object in space an echo is produced. This echo is received by receivers 50—53, which by means of collector devices 55—59 are successively connected to the amplifier 61, each one during ¼ of a turn of shaft 60.

62 is a rectifier device. 63—67 are partly insulated collector rings transposed ¼ of a revolution with respect to each other and adapted to let current pass to the condensers 68, 69 or 70, 71 at the same moment when the corresponding collector rings 55—59 make their contacts. The receivers 52 and 53 correspond to condensers 69 and 68 respectively. 72 and 73 are amplifying devices. 74 and 75 are polarized relays, each provided with two windings and contacts 81, 82, 83 and 84, 85, 86 respectively. If condensers 68 and 69 receive equal charges, they discharge equally through the windings of relay 74, but in opposite directions, so that the relay is not actuated. If, however, the target is not located symmetrically with respect to receivers 52 and 53, one condenser will receive more energy than the other. As a result, due to discharge through relay windings 74 relay armature 82 will be moved to one side or the other. The same is true with respect to receiver 50 and 51, condensers 71 and 70, respectively, and the polarized relay 75.

If thus condensers 68 and 69 thus obtain equal charges through receivers 52, 53, due to reflection of waves from a target it means that each receiver receives an equally large amount of energy reflected from said target. Accordingly, the target must be located exactly ahead and symmetrically with respect to transmitter 49 and receivers 52 and 53.

79 is a relay that operates as soon as one of polarized relays 74 or 75 closes one of its contacts. Elements 1 to 25 are contacts controlled by relay 79. Relays 87 and 88 are pole changing relays adapted to turn shaft 77 by means of motor 54 in one direction or the other. Similarly, relays 90 and 91 are pole changing relays. Shaft 103 is driven by motor 78 over worm gear 92. On said shaft are mounted contact wheel 93 with cam 94 and contact wheel 98 with cam 99 which cams operate their make contacts 95—97 and 100—102 respectively.

104 is a frequency meter which serves to indicate when the receivers are pointing directly at the target. 105 is a precision frequency meter to be read when the target is located exactly in the common axis of the transmitter and the receivers. 106 is a break contact adapted to free the device for searching out another target as soon as the first target is located or shot down.

Instead of the relays 75, 87 and 88 an electron-relay device can in known manner be utilized and connected between the amplifier 73 and the motor 54 to drive said motor at a variable speed proportional to the speed of the target so that the transmitter and receivers are always pointing exactly at the target no matter in which direction same is moving. Two gas filled electron relays may be provided, one corresponding, for example to receiver 50 and the other one to receiver 51. These electron relays are connected in known way in opposite directions and the motor 54 in bridge connection, so that no current will pass through the motor winding when equal current passes thorugh the electron relays in opposite directions, while current will pass through the winding in one or the other direction, depending upon which electron relay is traversed by the larger current. In this manner a variable speed of the motor 54 can be obtained to respond to the speed of the target. By connecting a tachometer to the motor shaft the exact side or elevation angle speed can be directly read on suitable scales. In the same way the relays controlling the other motor 78 can be replaced by electron relays.

Instead of an electric drive air or oil can be used in known way as driving means in order to obtain a smooth following action of the motors. Thus a small turbine or other suitable device can be used to turn the shafts, whereby the flow or pressure of air can be replaced by valves electrically controlled by each pair of receivers in similar way as above described.

The device according to Fig. 2, which is intended automatically to locate and follow, for example, an aircraft or group of airplanes, operates in the following manner. The device can be used either to search the whole sky but is preferably limited to searching but a certain section for instance in the direction from which an attack is expected. In the latter case the device can swing to and fro and up and down a certain number of degrees in each direction.

The device is particularly intended to cooperate with an antiaircraft battery for antiaircraft aiming, and the guns of said battery can be arranged to synchronously follow the movements of the searching and following device so that at every moment the guns are aimed at the target with suitable corrections, whether said target is visible or not. In this embodiment of the invention, the shaft 76 is, for example, adapted to make ½ turn in one second, while shaft 77 performs ½ a turn in 5 seconds. These movements can be directed by cam wheels 93 and 99, which emit electric impulses to relays 90 and 91 and relays 87 and 88 respectively. When said relays are alternatingly operated, the current to motors 78 and 54, respectively, is changed so that oscillatory movements are obtained.

When an object enters within the field of action of the transmitter and the receivers, one of the polarized relays 74 or 75 is operated, whereby relay 79 also is operated and receives holding current over the following circuit: Battery 80, relay 79, its contact 2—3 and 4—5, contact 84 and armature 85 of relay 75, ground.

Thereupon, the oscillatory movements and searching cease and after the actuation of relay 79 the device is connected for manual or automatic following operation of the now located target. If the located target is not exactly in the center of the field of action of the four receivers, the polarized relay 74, for example, operates and its armature 82 makes contact with contact 81. The following circuit is then closed: Ground, contact 83—81, contact 21—22 of relay 79, relay 91, battery 80. Relay 91 is thus operated and motor 78 receives current and rotates in a certain direction.

On the other hand, if the polarized relay 74 closes its contact 82—83, relay 90 is operated instead and motor 78 receives oppositely directed current until the target is encountered directly in the axis of the four receivers. When this condition is reached the armature of relay 74 returns to its normal position and relay 90 is de-energised. The rotor of motor 78 is thereby shortcircuited and immediately stops. In similar way the polarized relay 75, relays 87, 88 and motor 54 are operated.

As soon as the target changes its course, the respective relays are put in play so that the target will be steadily located exactly in the common axis of the receivers. By means of graduated scales on shafts 76 and 77 or by remote control devices, the elevation and side angles can at any moment be observed and read, or the guns of the battery can be synchronously driven, the necessary shooting element corrections being made to compensate for wind, time delays, etc. so that the guns will always be in position for a perfect hit. Range finder 105 supplies the necessary data for setting the time fuse of the projectiles. The present invention wastes no time and the guns are always ready to be fired at a target, whether same is visible or not. Besides, the present invention eliminates the expensive instruments for optical range finding, sound locator, instruments for measuring of side and elevation angles' velocities, side and elevation accelerations as well as searchlights.

In Fig. 3 element 107 is an ultrashort wave radio transmitter that can emit radio waves directed in a vertical plane. 108 and 109 are receivers that can receive reflected vertical radio waves in a vertical plane. 110 and 111 are receivers symmetrically and diagonally placed with respect to the other receivers 108 and 109 and adapted to receive reflected ultrashort waves of circular or point shape. The transmitter and the receivers are turnably arranged around the vertical shaft 76 by means of motor 78. Said transmitter and receivers are also turnably arranged around the horizontal shaft 77 by means of motor 54.

This embodiment of the invention is preferably intended to patrol a certain limited part of the sky, for instance a sector where an enemy attack can be expected. The transmitter 107 and the receivers 108 and 109 can thus patrol, for example, a 30° broad belt by allowing the vertical shaft 76 to rotate or by allowing it to swing to and fro over a certain part of the front. In the construction shown in Figure 3, 112 is a cam wheel with cam 113 on shaft 76. If the shaft 76 rotates to the left, the cam 113 presses the spring 114 and makes contact with springs 115 and 116. Relay 140 is thus operated and current to motor 78 is reversed so that the motor rotates in the other direction until cam 113 meets spring 114 from below and thereby interrupts the current to relay 140. The current is then again reversed to the motor 78 and so on.

As soon as an aircraft meets the waves emitted from transmitter 107 and waves are reflected and received by receiver 108 or 109, the polarized relay 75 is operated in the same way as previously described in connection with Fig. 2. Relay 137 or relay 138 are thus operated, whereby a circuit is closed causing relay 139 to operate and obtain holding current. The circuit of relay 140 is then interrupted so that said relay can no longer operate and remains without current. Motor 78 now continues to rotate in one or the other direction as long as relay 75 is operated in one or the other direction. When the aircraft is located directly in front of the transmitter 107 and receivers 108 and 109, the rotor is shortcircuited and the motor stops.

While the relay 139 is operated its contacts 11—12 are closed, and the motor 54 is simultaneously started. As a result, receivers 110 and 111, which together with transmitter 107 and receivers 108—109 performed a back and forth movement around the horizontal shaft 77, start hunting the target in vertical direction, in the same manner as above described for shaft 76.

As soon as the aircraft is located in the center of the field of action of the receivers, the movement ceases and by means of the relays the device is caused to exactly follow the movements of the aircraft in similar way as has been described in connection with Fig. 2.

In Fig. 4 elements 26 and 27 are transmitting and receiving means. Elements 39 and 46 are cathode ray tubes for general purposes as shown in Fig. 1. 141 is a central instrument for one or more batteries. 105 is a precision frequency meter, on which the range for the setting of the projectiles can be read. 49—53 are transmitter and receivers, respectively, as shown in Fig. 2 for individual searching and following of the target. 143 are antiaircraft guns which are preferably in synchronism with the said individual searching and following devices. Correction of the line of departure of the projectiles from the respective guns in order to hit the target, compensation for wind, etc. are carried out in known manner.

In Fig. 5 elements 145 and 153 are two reflectors intended to collect ultrashort radiowaves reflected from transmitter 49 in Fig. 2. Instead of four different receivers, as shown in Fig. 2, it is here proposed to use only one receiver 144 with a dipole 152. 146 and 155 are small reflectors placed in the foci of reflectors 145 and 153. From these foci received waves are reflected through the holes 147 and 154 against reflecting screens 148 and 156 which are so located as to reflect the waves to the dipole 152. Element 150 is a metal disc provided with a hole 151. The disc is driven by a motor 149. Each time the hole of the disc passes, reflected waves from the reflecting screen 148 and 156 are allowed to act on the dipole 152 according to the wave energy received in the reflectors 145 and 153.

Instead of two reflectors, as shown, the device can be provided with four reflectors which together with a single dipole can be used instead of the four complete receivers shown in Fig. 2. Except for these changes, the condensers 70—71 and 68—69 in Fig. 2 are charged in similar manner as previously described and the polarized relays are operated, depending upon whether more energy is received in any one of the reflectors than in the others.

According to another embodiment of the invention the receivers in Figs. 2, 3 and 4 and 5 are replaced by a single receiving reflector close to the focus of which four individual receiving dipoles are symmetrically arranged in such a way that one pair of dipoles are placed at right angles to the other pair of dipoles. In this case the transmitting reflector should be provided with two dipoles at right angles to each other, so as to obtain the reflected waves in the proper plane to actuate the respective dipoles of the receiving reflector. The receiving dipoles are then connected in the same way as the individual receivers 109—111 shown in Fig. 3. In this case a fire control device of relatively small size is provided consisting of but one transmitting and one receiving reflector for directed waves of which the latter is provided with two or four dipoles symmetrically placed in pairs and at right angles around the focus as above described. The device for searching out and following the target will thus have an appearance more or less as that shown at the top of Fig. 1.

Fig. 6 represents an embodiment of the invention according to which the searching or hunting device is utilized to immediately report to a district or other antiaircraft command the arrival of aircrafts within a certain defense zone. 26 and 27 are respectively a transmitter and a receiver which are horizontally and vertically movable as shown in Fig. 1.

The movements can be made continuous or oscillating as shown in Fig. 3, movement in a vertical plane is obtained by means of cam wheel 117, contacts 119—121 and relay 161, while movement in a horizontal plane is produced by means of cam wheel 112, contacts 114—116 and relay 162. 33 is an amplifier and 157 is a high pass filter to eliminate disturbances that may be caused by flying birds within a range of, for example, 200 meters. 159 is a frequency and distance meter. 158 is a rectifying bridge device arranged in known way. 160 is a relay to be operated by the rectified and amplified beat frequency current. 173 is an alternating current source adapted to send signaling current over, for example, a telephone station line to the nearest central exchange 174. The voltage of the signal current source 173 is higher than that normally used on the telephone line. 175 is a rectifying device. 176 is a relay and 177 is a glow lamp valve to operate relay 176 only when a high voltage current from generator 173 is received. 180 is a slowly acting relay and 181 is a still more slow acting relay provided with a condenser 182 for the special purpose described hereafter. 184 is a generator for producing an alternating voltage higher than that ordinarily used at the central station.

If the signal has to be relayed over still another (194) or several other central offices, an ordinary trunkline between said offices can be used for the purpose. In the same manner the signal can be relayed over any number of central offices without materially disturbing normal service as shown between offices 174 and 194.

In the central office 194, element 185 represents a rectifying device. 186 is a relay and 187 is a glow lamp valve. 189 is a very slow acting relay including a condenser 190. 195 is a relay in the antiaircraft central command. 196 is a small lamp placed on a map of the region and corresponding to the center of the patrol zone of the locator device 26—27. The device operates in the following manner. If while searching through the sky the frequency modulated waves emitted by the transmitter 26 encounter aircraft, waves are reflected and received by receiver 27. The waves are amplified in amplifier 33 and after passing through a high pass filter the current is rectified in rectifying device 158 and actuates relay 160 while at the same time the beat frequency and distance can be read or observed on frequency meter 159 or on a cathode ray tube as shown in Fig. 1.

Relay 160 upon being operated closes its contacts 1—2 and 3—4, whereby signal alternating current from generator 173 is transmitted over a telephone line connected to central office 174. In said office the signal is rectified in rectifying device 175 and the signal is received by relay 176 which latter is operated and closes its contacts 178—179. Relay 180 is thus operated and in its turn operates slow acting relay 181. When relays 180 and 181 are thus operated they disconnect the telephone line from its normal exchange connections and disconnect an outgoing trunkline to central office 194, while said trunkline is simultaneously disconnected from its normal central equipment. In these operations alternating signal current is impressed on said trunkline at central office 174 by means of generator 184. Said relayed signal current is rectified in central office 194 by rectifying device 185 and relay 186 operates, closing its contacts 191—192.

When said contacts are closed, slow acting relay 189 is operated and while disconnecting the incoming trunkline from office 194 the said trunkline is directly connected to a junction line leading to the fire control command, where relay 195 is operated, lighting signal lamp 196 on a map.

In order not to disturb normal operation of telephone and trunk lines, glow lamp valves 177 and 187 at central office 174 and 194, respectively, are connected in series with the respective relays 176 and 186.

If normal signaling current on said lines is, for example, 80 volts, the voltage of the special signal generators 173 and 184 is set at 120 volts. The valves 177 and 187 are set so as not to operate for the lower voltage, but as soon as the high voltage signal current is received relays 176 and 186 are operated during the time when relay 160 is operated at the patrol station. Inasmuch as direct connection between the patrol station and the fire control command is needed only during the short time that waves are reflected from the air, that is, for example every time when the locator device during its searching operations encounters an airplane in the sky, the normal telephone connections are very little disturbed.

In order to securely get a short signal relayed all the way to the fire control command over several central offices, slow acting relays 180 and 181 and 189 are connected to the circuits. Relay 180 disconnects the signaling current after a few seconds, if only a short impulse is originally transmitted. Relays 181 and 189, on the other hand, act more slowly due to the condensers 182 and 190. Said relays can be arranged to disconnect after many seconds, depending upon the capacity of the condensers. This latter feature is convenient, if there is an observer at the patrol station who has to verbally report to the fire command the direction and distance of the located aircrafts within the particular zone.

In such a case the observer can press a switch button and connect a telephone 198 directly to the line for short verbal communication during an air raid. The relays 181 and 189 will then be operated a sufficiently long time to make short verbal reports, whereafter the lines are automatically restored to normal.

The high pass filter 157 can suitably be arranged to cut off all beat frequencies which correspond to distances shorter than, for example, 200 meters so that the flight of birds and the like in front of the wave emitting device do not cause false alarms.

Fig. 7 shows a map with signal lamps 196 located at places corresponding to the locator centers 27 or automatic control devices as shown in Fig. 6. Each section of a fire control command can be provided with any number of such patrol centers, which, if desired, may overlap, so that a certain zone of the country is completely covered. If an aircraft tries to fly over said zone, a lamp will glow for each section which the aircraft passes so that the presence and the flight direction of the aircraft can be observed on the map at a glance.

Having now particularly described and ascertained the nature of our invention and in what manner the same is to be performed, we declare that what we claim is:

1. A system for locating and following an object in space comprising, in combination, a single transmitter adapted to emit a highly directive beam of radio waves, receiving means comprising directional scanning means adapted to scan in slightly diverging directions to receive the waves reflected by said object when hit by said directive beam of radio waves, means for orientating said receiving means in at least one plane, said orientating means comprising driving means, a distributing device coupled to the receiving means and to the said driving means, a single amplifier and a rectifier interconnected between the receiving means and said distributing device to amplify and rectify the received radio energy, said distributing device being adapted to counter-direct two successively received amounts of radio energy from two slightly different directions in a certain plane of a field of scanning, said two amounts of energy corresponding to two oppositely located equal parts of the said field, said distributing device directing the resulting difference of the received radio energies to said driving means to operate same in one or the other direction in said plane, depending upon which of the said two amounts of energy is the major one, in order to automatically follow the object.

2. A system for locating and following an object in space comprising, in combination, a single transmitter adapted to emit a highly directive beam of radio waves, receiving means comprising directional scanning means adapted to scan in slightly diverging directions to receive beams transmitted by said transmitter and reflected by said object, driving means adapted to orientate said receiving means in a plurality of planes in order to bring said object into the directional limited field of scanning of said scanning means, a switching device electrically connected to said driving means, said switching device controlling said driving means and being controlled by the receiving means in accordance with the reflected radio energy received by said receiving means, whereby said switching device will automatically switch the driving means from locating the object to following the object, when radio energy from the located object has been received by said receiving means, a distributing device coupled to the receiving means in series with said switching device with respect to the said driving means, a single amplifier and rectifier interconnected between the receiving means and said distributing device to amplify and rectify the received radio energy, said distributing device adapted to counter-direct two successively received amounts of radio energy from two slightly different directions in a certain plane of the field of scanning corresponding to two oppositely located equal parts of the said field and to direct the resulting difference of the received radio energies to said driving means to operate same in one or the other direction in said plane, depending upon which of the said two amounts of energy is the major one, whereby the object is automatically followed with the center line of the said transmitter and said receiving means always pointing at the object.

3. The system claimed in claim 1, in which the receiving means consists of two pairs of receivers, the respective pairs being arranged in two planes at right angles to each other, each receiver of such a pair being adapted to receive energy from equal opposite parts of the field of scanning.

4. The system claimed in claim 1, in which the driving means consists of an electrical motor provided with a polarity reversing means to drive the motor in one or the other direction by changing the polarity of the field coil of the motor.

5. The system claimed in claim 1, in which the distributing device comprises a polarized relay, the same being sensitive to changes in the direction of the current and actuated by the resulting difference between two successive amounts of radio energy received from two opposite equal parts of the field of scanning, whereby said driving means are turned in one direction or the other.

6. The system claimed in claim 1, in which said distributing device comprises a circuit, two equally sized condensers in said circuit, at least one pair of make- and break-contacts interconnected between the receiving means and the condensers, and a polarized relay provided with two windings of opposite direction, each winding connected in parallel to one of said condensers, said make- and break-contacts being adapted to alternatingly connect the said receiving means to said condensers and to said polarized relay.

7. The system claimed in claim 2, in which said distributing device comprises a polarized relay, the same being sensitive to changes in the direction of the current, and in which the device for switching from locating the object to following the object consists of a relay device operable by said polarized relay.

8. The system claimed in claim 1, in which the transmitter is a rotatable, ultrashort radio wave transmitter, and said transmitter and receiving means being directed in substantially the same direction and being synchronously and automatically rotatable in two planes at right angles to each other.

9. The system claimed in claim 1, in which the receiving means consists of a single directional ultrashort radio wave receiver, a rotating screen disposed in front of the latter, said screen being provided with an eccentrically located hole and adapted to divide and scan the field of scanning, whereby successively reflected energy from an object in different opposite equal parts of the field of scanning is alternatingly passed to the receiver and to the said driving means.

10. System for locating and following an object in space comprising, in combination, a single transmitter adapted to emit a highly directive beam of ultrashort frequency modulated radio waves, receiving means comprising directional scanning means adapted to scan in slightly diverging directions and to receive beams transmitted by said transmitter and reflected by said object located in space, to cause a beat frequency between said transmitted and reflected received waves, means for orientating said receiving means in two planes at right angles to one another, said orientating means comprising a horizontal and a vertical shaft, driving means to turn said shafts and receiving means coupled thereto in said planes, a distributing device coupled to the receiving means and to the said driving means, a circuit, said distributing device disposed in said circuit, a single amplifier and rectifier interconnected between the receiving means and said distributing device to amplify and rectify the received radio energy, said distributing device being adapted to counter-direct two successively received amounts of radio energy from two slightly different directions in a certain plane of a field of scanning corresponding to two oppositely located equal parts of the said field and to direct the resulting difference of the received radio energies to said driving means to operate same in one or the other direction in said plane depending upon which of the said two amounts of energy is the major one, in order to automatically follow the object; indicating means coupled to the vertical and horizontal shafts to continuously indicate the side and elevation angles to said objects, respectively, and a frequency meter coupled to said receiving means and provided with a scale graded to continuously indicate the distance to said object.

11. System for locating and following an object in space comprising, in combination a single transmitter adapted to emit a highly directive beam of radio waves, receiving means comprising directional scanning means adapted to scan in slightly diverging directions and to receive beams transmitted and reflected by said object located in space, means for orientating said receiving means in two planes at right angles to another and comprising a horizontal and a vertical shaft, driving means to turn said shafts, said receiving means being coupled thereto in said planes, a distributing device for distributing radio energy, said distributing device being coupled to the receiving means and to the said driving means, a circuit, said distributing device being disposed in said circuit, a single amplifier and rectifier interconnected between the receiving means and said distributing device to amplify and rectify the received radio energy, said distributing device being adapted to counter-direct two amounts of radio energy received successively from two slightly different directions in a certain plane of a field of scanning corresponding to two oppositely located equal parts of the said field and to direct the resulting difference of the received radio energies to the said driving means to operate same in one or the other direction in said plane, depending upon which of the said two amounts of energy is the major one, to automatically follow the object, and indicating means coupled to the vertical and horizontal shafts to continuously indicate the side and elevation angles to said object respectively.

12. In a system as claimed in claim 11, a pair of tachometers, each being provided with a reading scale graded in angle speed per second, one tachometer being coupled to each of said horizontal and vertical shafts to continuously measure the side and elevation angle speed respectively of said object.

13. In a system for locating and following an object in space comprising, in combination a single transmitter adapted to emit a highly directive beam of frequency moduated radio waves, receiving means adapted to scan in slightly diverging directions and to receive beams transmitted by said transmitter and reflected by said object once located in space, to cause a beat frequency between said transmitted and reflected received waves, means for orientating said receiving means in at least one plane, said orientating means comprising driving means, an electric energy distributing device coupled to the receiving means and to the said driving means, a circuit, said distributing device being disposed in said circuit, a single amplifier and rectifier interconnected between the receiving means and said distributing device to amplify and rectify the received radio energy, said distributing device being adapted to counter-direct two amounts of radio energy received successively from two slightly different directions in a certain plane of a field of scanning corresponding to two oppositely located equal parts of the said field, and to direct the resulting difference of the received radio energies to said driving means to operate same in one or the other direction in said plane depending upon which of the said two amounts of energy is the major one, to automatically follow the object, and a frequency meter coupled to said receiving means, said frequency meter being provided with a graduated scale for continuously indicating the distance to said object.

14. In a system for locating and following of objects in space by means of rotatable transmitting and receiving means pointing in substantially the same direction for the transmission and the reception of directed radio waves reflected from said objects, the combination of driving means adapted to rotate the transmitting and receiving means in at least one plane, impulse-transmitting means coupled to said driving means and adapted to automatically transmit electric impulses to said driving means to turn said transmitting and receiving means in predetermined, compulsory paths in at least one plane in order to systematically locate an object in space, and controlling means coupled to said receiving means and adapted to successively transfer amounts of radio energy from two opposite directions of a certain plane within a limited field of search to said driving means for driving in one or the other direction, and a switching device coupled to and governed by said controlling means upon reception of reflected energy, said switching device being adapted to disconnect said directing means from said driving means and to couple said controlling means to said driving means for controlled driving and following of an object at the moment when an amount of reflected energy has been received in the receiving means.

15. The system claimed in claim 14, in which said receiving means is adapted to successively receive radio energy from two substantially parallel directions in the corresponding plane, said device comprising a circuit including said distributing and receiving means; said amplifying and distributing means being coupled between the receiving means and the said controlling means, said distributing means comprising means to counter-direct two successively received amounts of radio energy from two oppositely located equal parts of the field of search and to deliver the resulting energy difference to the said controlling means in order to automatically turn the transmitting and the receiving means in one or the other direction in the corresponding plane, depending upon which of the said amounts of energy is the greater, until the center axis of the said transmitting and receiving means, at every moment, is exactly pointing at the corresponding object.

16. A system for locating and following objects in space comprising rotatable transmitting and receiving means pointing in substantially the same direction for the transmission and reception of directed radio waves reflected from the object, driving means for rotating said transmitting and receiving means in at least one plane, directing means coupled to said driving means and adapted to automatically turn said transmitting and receiving means in predetermined paths in order to systematically search for an object in space, an electromagnetic operating device, amplifying and distributing means coupled to said receiving means and to said electromagnetic operating device and adapted to transfer radio energy to the latter, said electromagnetic operating device being adapted to control said driving means, and being controlled in its movements by said amplifying and distributing means, a switching device coupled to said electromagnetic operating device, said switching device being adapted to disconnect said directing means from said driving means, said electromagnetic operating device actuating said switching device at the moment when reflected energy from a located object is received in the receiving means in order to disconnect said directing means from said driving means and establish control over said driving means for following said object in accordance with the movements of said electromagnetic operating device, said amplifying and distributing means serving successively to receive and amplify amounts of radio energy from two somewhat diverging directions in the same plane corresponding to equal parts of the field of search, and to transfer two such successively received amounts of radio energy and deliver the resulting energy difference, if any, to said electromagnetic operating device, in order to indicate and follow the movement of said object in space in one direction or the other in the respective plane, depending upon which amount of energy is the greater.

HELGE FABIAN ROST.
KARL HARRY THUNELL.
STEN DANIEL VIGREN.
PER HARRY ELIAS CLAESSON.